(12) United States Patent
Mizushiri et al.

(10) Patent No.: US 10,250,155 B2
(45) Date of Patent: Apr. 2, 2019

(54) ELECTRICAL POWER CONVERSION DEVICE

(71) Applicant: DENSO CORPORATION, Kariya-city, Aichi-pref. (JP)

(72) Inventors: Keisuke Mizushiri, Kariya (JP); Akira Nakasaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 550 days.

(21) Appl. No.: 15/058,490

(22) Filed: Mar. 2, 2016

(65) Prior Publication Data

US 2016/0261207 A1 Sep. 8, 2016

(30) Foreign Application Priority Data

Mar. 6, 2015 (JP) .................................. 2015-045232

(51) Int. Cl.
*H02M 7/5387* (2007.01)
*H02M 7/00* (2006.01)

(52) U.S. Cl.
CPC ......... *H02M 7/003* (2013.01); *B60L 2210/00* (2013.01); *B60L 2240/525* (2013.01)

(58) Field of Classification Search
CPC .................................................. H02M 7/003
USPC ........................................ 363/132; 174/72 B
See application file for complete search history.

(56) References Cited

U.S. PATENT DOCUMENTS

| 2003/0200761 | A1* | 10/2003 | Funahashi | ............... F01C 21/10 |
| | | | | 62/228.4 |
| 2008/0049477 | A1 | 2/2008 | Fujino et al. | |
| 2012/0300521 | A1 | 11/2012 | Hida et al. | |
| 2013/0058068 | A1 | 3/2013 | Funatsu | |
| 2014/0118909 | A1 | 5/2014 | Matsuno et al. | |
| 2017/0331406 | A1* | 11/2017 | Hara | ........................ H02M 7/48 |

FOREIGN PATENT DOCUMENTS

| JP | 2010-119274 | A | 5/2010 | |
| JP | 2012249480 | A | * 12/2012 | ............ H02M 7/003 |
| JP | 2013-055840 | A | 3/2013 | |

\* cited by examiner

*Primary Examiner* — Timothy J Thompson
*Assistant Examiner* — Charles Pizzuto
(74) *Attorney, Agent, or Firm* — Oliff PLC

(57) ABSTRACT

An electric power conversion device has semiconductor modules, a main P bus bar, a main N bus bar, a capacitor module, an input P bus bar and an input N bus bar. The input N bus bar is connected to the DC power source. The main N bus bar is connected to a negative electrode terminal of the semiconductor module to supply the DC power. A capacitor N bus bar, a filter capacitor and a smoothing capacitor in the capacitor module are molded by capacitor molded resin. The capacitor N bus bar is connected to a negative electrode terminal of the filter capacitor. The input N bus bar has a first N connection section connected to the capacitor N bus bar and a second N connection section connected to the main N bus bar. The main N bus bar is arranged outside of the capacitor mold resin.

8 Claims, 4 Drawing Sheets

ELECTRICAL POWER CONVERSION DEVICE

CROSS-REFERENCE TO RELATED APPLICATION

This application is related to and claims priority from Japanese Patent Application No. 2015-45232 filed on Mar. 6, 2015, the contents of which are hereby incorporated by reference.

BACKGROUND OF THE INVENTION

1. Field of the invention

The present invention relates to electric power conversion devices or power converters capable of converting direct current power to alternating current power.

2. Description of the Related Art

A general electric power conversion device has semiconductor modules, a capacitor, an input bus bar, a capacitor bus bar, etc. The semiconductor modules convert direct current power (DC power) to alternating current power (AC power). The capacitor smooths the electric power. The input bus bar is connected to a direct current power source (i.e. a DC power source). The capacitor is connected to the input bus bar through the capacitor bus bar. A patent document 1 as a conventional technique, Japanese patent laid open publication No. 2013-55840 uses a capacitor module having a structure in which the capacitor and the capacitor bus bar are assembled together and molded by resin. The capacitor bus bar is connected to a main bus bar. This main bus bar is connected to the semiconductor modules to supply an electric power to the semiconductor devices.

The electric power supplied through the main bus bar is further supplied to the input bus bar through the capacitor bus bar which is molded in the capacitor module.

However, the structure of the electric power conversion device disclosed by the patent document 1 previously described has a drawback. That is, because the electric power involving a direct current component (DC component) is supplied to the capacitor bus bar, the DC component of the electric power generates heat energy when the DC component of the electric power passes through the capacitor bus bar. In addition, because the capacitor bus bar is assembled to and molded in the capacitor module, the heat energy generated in the capacitor bus bar increases a temperature of the capacitor, and sometimes breaks the capacitor module. This causes deterioration of the capacitor module, and reduces the life time of the capacitor.

SUMMARY

It is therefore desired to provide an electric power conversion device with high reliability capable of suppressing a temperature of a capacitor therein from increasing.

An exemplary embodiment provides an electric power conversion device capable of performing a power conversion of direct current power to alternating current power.

The electric power conversion device has one or more semiconductor modules, a control circuit board, a main P bus bar, a main N bus bar, a capacitor module, an input P bus bar and an input N bus bar. Each of the semiconductor modules has a built-in semiconductor element, a positive electrode terminal, a negative electrode terminal and a control terminal. The control circuit board is connected to the control terminal of each of the semiconductor modules. The control circuit board drives the built-in semiconductor elements of the semiconductor modules. The main P bus bar is connected to the positive electrode terminal of the semiconductor module, through which direct current power is supplied. The main N bus bar is connected to the negative electrode terminal of the semiconductor module, through which the direct current power is supplied.

The capacitor module has a first capacitor, a capacitor P bus bar and a capacitor N bus bar. The first capacitor, the capacitor P bus bar and the capacitor N bus bar are molded by capacitor mold resin. The capacitor P bus bar is connected to a positive electrode terminal of the first capacitor, and the capacitor N bus bar is connected to a negative electrode terminal of the first capacitor.

The input P bus bar is connected to a positive electrode terminal of direct current power source, i.e. a DC power source.

The input N bus bar is connected to a negative electrode terminal of the DC power source. The input N bus bar has a first N connection section and a second N connection section. The first N connection section is connected to the capacitor N bus bar. The second N connection section is connected to the main N bus bar. The main N bus bar is arranged outside of the capacitor mold resin with which the first capacitor, the capacitor P bus bar and the capacitor N bus bar are molded.

The electric power conversion device 1 has the improved structure previously described in which the main N bus bar is connected to the input N bus bar, not through the capacitor N bus bar, where the capacitor N bus bar is molded in the capacitor mold resin. That is, the main N bus bar is not molded in the capacitor mold resin. In other words, the main N bus bar is arranged outside of the capacitor mold resin. This structure makes it possible to prevent the DC current from flowing in the capacitor module. As a result, this structure prevents propagation of heat energy generated by the DC power to the capacitor molded in the capacitor mold resin in the capacitor module. This makes it possible to prevent a temperature of the capacitor in the capacitor module from increasing, and makes it possible to prevent deterioration and damage to the capacitor. It is therefore possible for the present invention to provide the electric power conversion device with high reliability.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
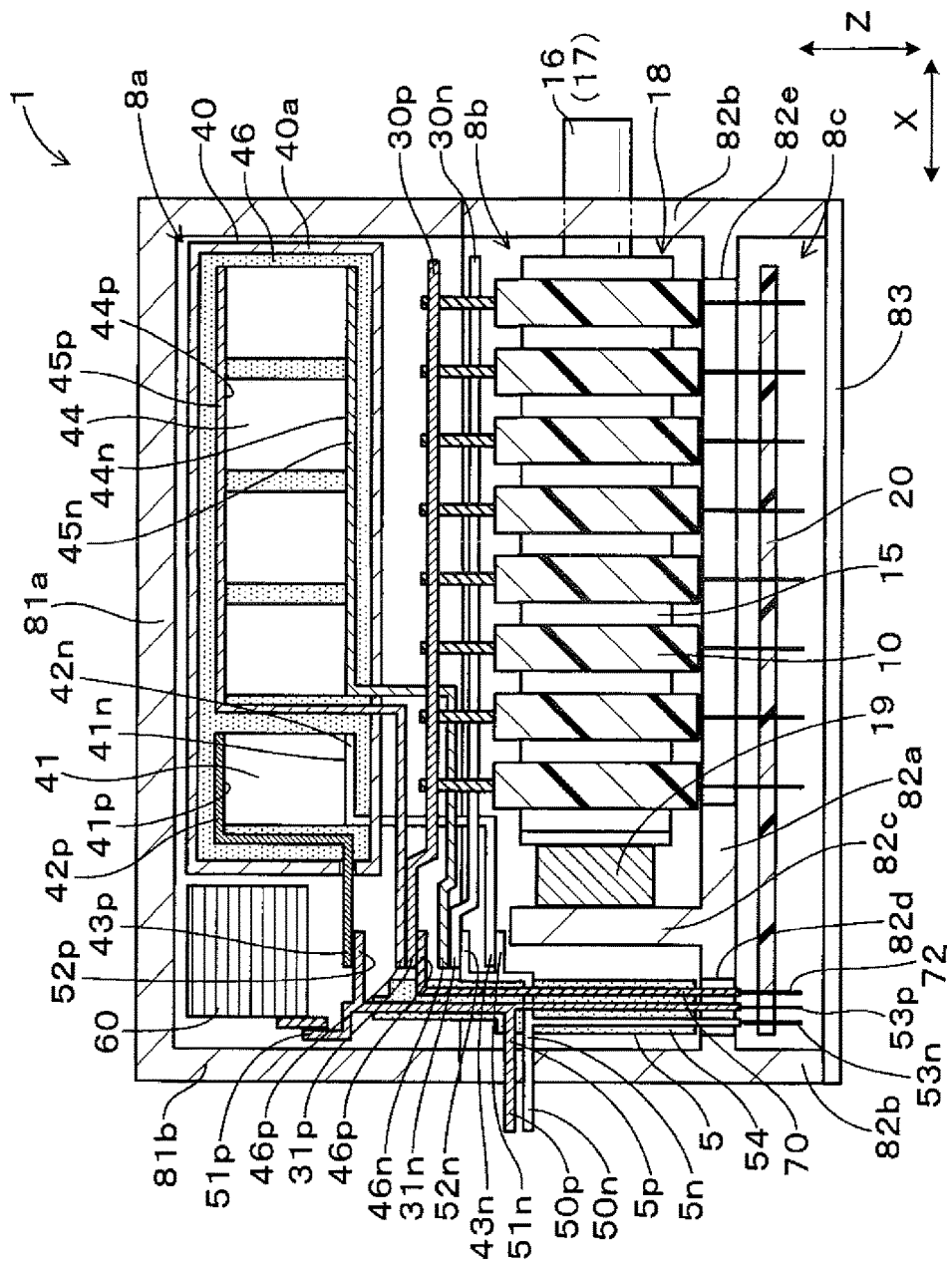
FIG. 1 is a view showing a schematic cross section of an electric power conversion device according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

The electric power conversion device according to the present invention can be applied to electric vehicles and hybrid vehicles.

Exemplary Embodiment

A description will be given of a structure and behavior of the electric power conversion device 1 according to an exemplary embodiment with reference to FIG. 1 to FIG. 6.

FIG. 1 is a view showing a schematic cross section of the electric power conversion device 1 according to the exemplary embodiment.

The electric power conversion device 1 converts direct current power (DC power) to alternating current power (AC power). As shown in FIG. 1, the electric power conversion device 1 has a plurality of semiconductor modules 10, a control circuit board 20, a main P bus bar 30p, a main N bus bar 30n, a capacitor module 40, an input P bus bar 5p, and an input N bus bar 5n.

Each of the semiconductor modules 10 has built-in semiconductor element 11. For example, each of the semiconductor modules 10 shown in FIG. 6 has a pair of the semiconductor elements 11. A control circuit is arranged on the control circuit board 20. The control circuit is connected to a control terminal 13 of each of the semiconductor modules 10, and drives and controls the behavior of each built-in semiconductor element 11.

As shown in FIG. 1, the main P bus bar 30p is connected to a positive electrode terminal of each of the semiconductor modules 10. The main N bus bar 30n is connected to a negative electrode terminal of each of the semiconductor modules 10. The capacitor module 40, a capacitor P bus bar 42p and a capacitor N bus bar 42n are molded together by capacitor mold resin 46. The capacitor P bus bar 42p is connected to a positive electrode terminal 41p of a filter capacitor 41. The capacitor N bus bar 42n is connected to a negative electrode terminal 42n of the filter capacitor 41.

The input P bus bar 5p is connected to a positive electrode terminal 2p (see FIG. 6) of a direct current power source (DC power source) 2. The input N bus bar 5n is connected to a negative electrode terminal 2n (see FIG. 6) of the DC power source 2.

The input N bus bar 5n has a first N connection section 51n and a second N connection section 52n. The first N connection section 51n is connected to the capacitor N bus bar 42n. The second N connection section 52n is connected to the main N bus bar 30n. The main N bus bar 30n is arranged to protrude from the capacitor mold resin 46.

A description will now be given of the structure and behavior of the electric power conversion device 1 according to the exemplary embodiment in detail.

Figure 6:
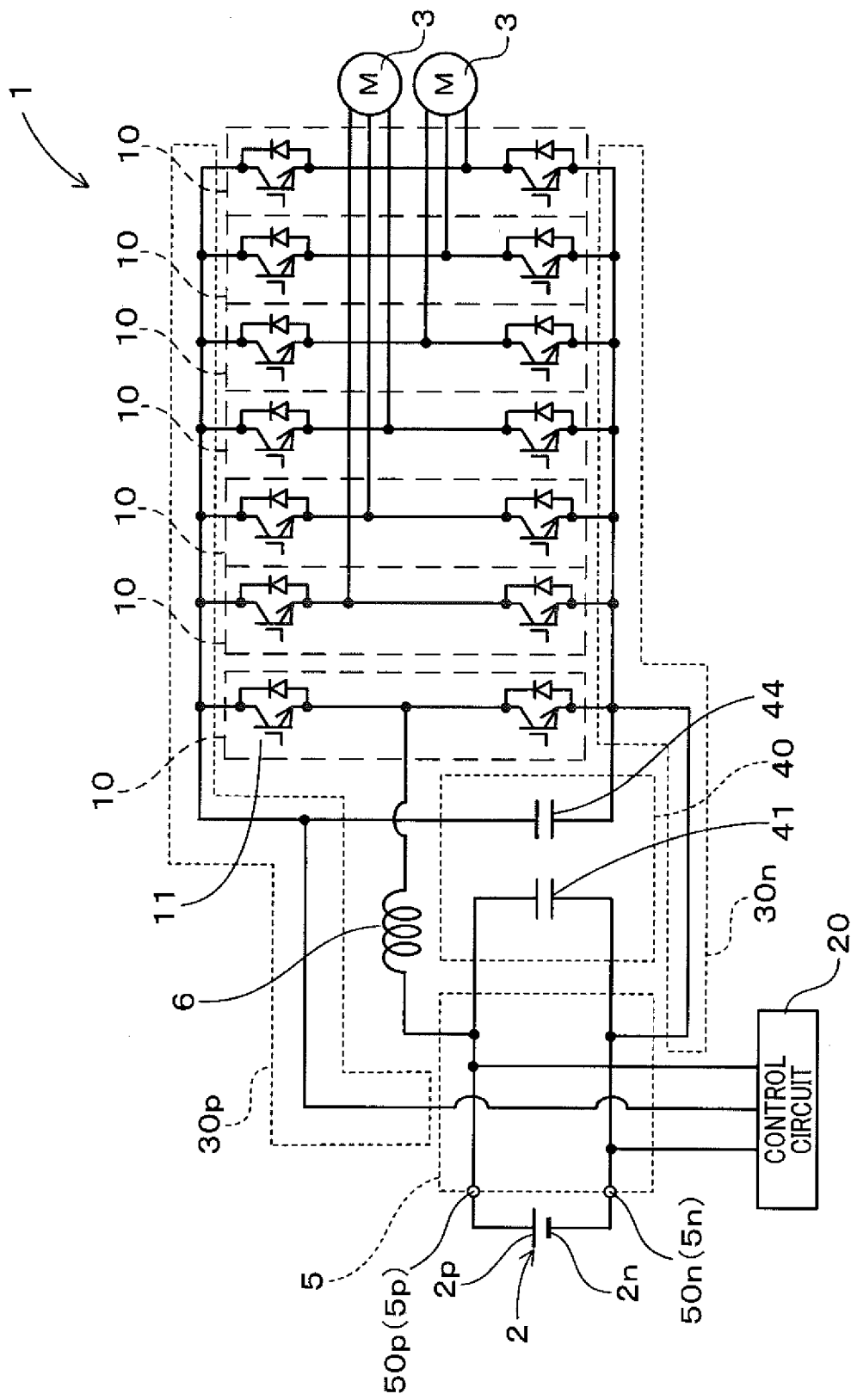
FIG. 6 is a schematic view showing a circuit diagram of the electric power conversion device according to the exemplary embodiment shown in FIG. 1.

FIG. 6 is a schematic view showing a circuit diagram of the electric power conversion device 1 according to the exemplary embodiment shown in FIG. 1. The electric power conversion device 1 has the circuit shown in FIG. 6. The electric power conversion device 1 converts a DC power supplied from the DC power source 2 to three phase AC power. An alternating current load (AC load) is driven by the converted three phase AC power.

As shown in FIG. 1, the electric power conversion device 1 has an upper side casing 81, a bottom side casing 82 and a cover 83. The upper side casing 81 has a top plate 81a having a rectangle shape and four side wall plates 81b. The side wall plates are arranged vertically to the top plate 81a. The upper side casing 81 has an open section which is opposite to the top plate 81a. A first storage section 8a is surrounded by the top plate 81a and the side wall plates 81b.

In the structure of the electric power conversion device 1 according to the exemplary embodiment shown in FIG. 1, the top plate 81a is arranged in a direction X and a direction Y. The direction X is perpendicular to the direction Y, and the side wall plates 81b are arranged in a direction Z.

As shown in FIG. 1, the bottom side casing 82 is arranged in the open section of the upper side casing 81. The bottom side casing 82 has a partition plate 82a and four side wall plates 82b. The partition plate 82a is arranged parallel to the top plate 81a. The side wall plates 82b are arranged vertically to the partition plate 82a. A second storage section 8b is surrounded by the partition plate 82a and the side wall plates 82b.

The partition plate 82a has a vertical wall 82c, a first through hole 82d and a second through hole 82e. The vertical wall 82c is arranged in a direction toward the upper side casing 81. The first through hole 82d and the second through hole 82e are formed in the partition plate 82a to penetrate in the direction Z.

As shown in FIG. 1, each of the side wall plates 82b projects toward the direction which is opposite to the upper side casing 81 side when compared with the partition plate 82a. The projected end section of each of the side wall plate 82b are covered with the cover 83. A third storage section 8c is surrounded by the partition plate 82a and the side wall plates 82b.

As shown in FIG. 1, the capacitor module 40 and a reactor 60 are arranged and stored in the first storage section 8a. The capacitor module 40 has a capacitor casing 40a. The filter capacitor 41, a capacitor P bus bar 42p and a capacitor N bus bar 42n are arranged in the inside of the capacitor casing 40a, and molded together by capacitor mold resin 46 in the capacitor casing 40a. A smoothing capacitor 44, a positive electrode bus bar 45p and a negative electrode bus bar 45n are arranged in the capacitor module 40, and molded together by the capacitor mold resin 46.

As shown in FIG. 1, a plurality of the semiconductor modules 10 is stored in the second storage section 8b.

Figure 5:
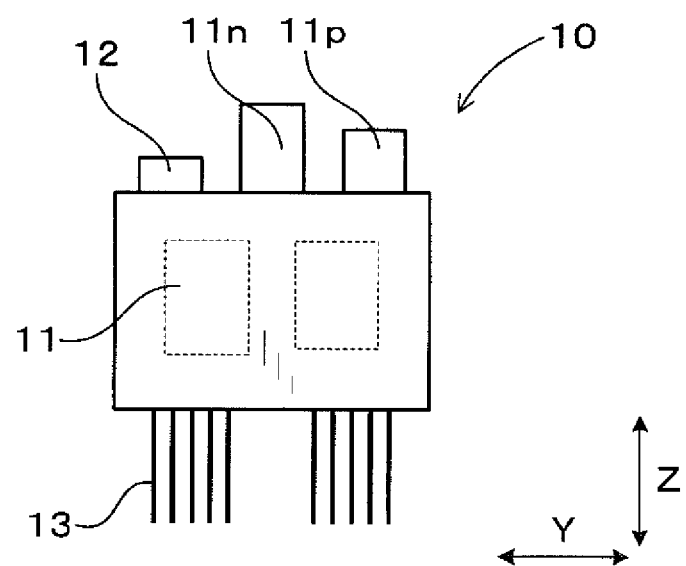
FIG. 5 is a front view of a semiconductor module in the electric power conversion device according to the exemplary embodiment shown in FIG. 1.

FIG. 5 is a front view of one of the semiconductor modules 10 in the electric power conversion device 1 according to the exemplary embodiment shown in FIG. 1. The semiconductor module 10 has a structure in which two devices, i.e. two built-in semiconductor elements 11 are arranged. Further, the semiconductor module 10 has a positive electrode terminal 11p, a negative electrode terminal 11n, an output terminal 12 and a control terminal 13. As shown in FIG. 1, the exemplary embodiment shows a plurality of the semiconductor modules 10. The semiconductor modules 10 and a plurality of cooling tubes 15 are alternately arranged in the direction X. That is, the semiconductor module 10 and the cooling tubes 15 are alternately stacked to form a laminated body 18. The laminated body 18 is pressed by a pressing member 19 so that the semiconductor modules 10 and the cooling tubes 15 are alternately adhered together in the direction X.

A coolant supplying section 16 supplies a coolant to the cooling tubes 15 in order. The coolant is discharged from the cooling tubes 15 to the outside of the electric power conversion device 1 through a coolant outlet section 17. The coolant supplying section 16 and the coolant outlet section 17 are arranged in the direction Y. As previously described, this direction Y is perpendicular to the direction X and the direction Z, respectively. The direction Y is omitted from FIG. 1.

Figure 3:
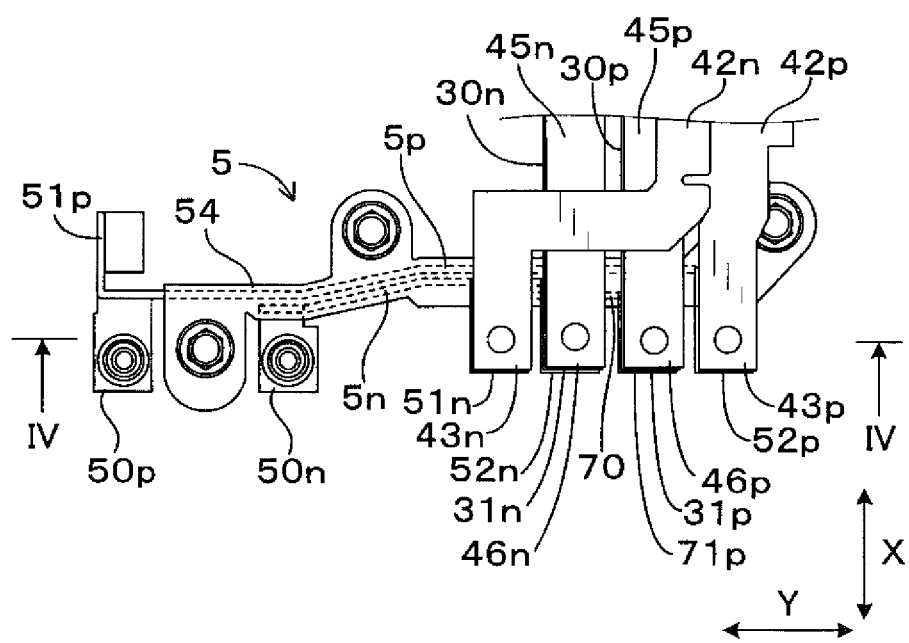
FIG. 3 is a top view showing bus bars which are electrically connected to the input bus bar module in the electric power conversion device according to the exemplary embodiment shown in FIG. 1.

FIG. 3 is a top view showing the bus bars which are electrically connected to an input bus bar module 5 in the electric power conversion device 1 according to the exemplary embodiment shown in FIG. 1. As shown in FIG. 1 and FIG. 3, the electric power conversion device 1 according to the exemplary embodiment has the capacitor P bus bar 42p, the capacitor N bus bar 42n, the input P bus bar 5p, the input N bus bar 5n, a detection bus bar 70, the main P bus bar 30p, the main N bus bar 30n, the positive electrode bus bar 45p and the negative electrode bus bar 45n.

As shown in FIG. 1, the capacitor P bus bar 42p is connected to a positive electrode terminal 41p of the filter capacitor 41. The capacitor P bus bar 42p has a capacitor P connection section 43p. The capacitor N bus bar 42n is connected to a negative electrode terminal 41n of the filter capacitor 41. The capacitor N bus bar 42n has a capacitor N connection section 43n.

As shown in FIG. 1, the input P bus bar 5p has an input P connection section 50p, a reactor connection section 51p, a second P connection section 52p and a control circuit P connection section 53p. As shown in FIG. 6, the input P connection section 50p of the input P bus bar 5p is connected to a positive electrode 2p of the DC power source 2. The reactor connection section 51p is connected to the reactor 60. The second P connection section 52p is connected to the capacitor P connection section 43p. The control circuit P connection section 53p is connected to the control circuit board 20.

Further, the input N bus bar 5n has a power source N connection section 50n, a first N connection section 51n, the second N connection section 52n and a control circuit N connection section 53n. As shown in FIG. 6, the power source N connection section 50n of the input N bus bar 5n is connected to the negative electrode terminal 2n of the DC power source 2. The first N connection section 51n is connected to the capacitor N connection section 43n. The second N connection section 52n is connected to a main N bus bar connection section 31n arranged in the main bus bar 30n. The control circuit N connection section 53n is connected to the control circuit board 20.

The detection bus bar 70 has a first P connection section 71p and a control circuit connection section 72. The first P connection section 71p is connected to a main P bus bar connection section 31p of the main P bus bar 30p. The control circuit connection section 72 is connected to the control circuit board 20.

As shown in FIG. 1, the main N bus bar 30n is connected to each of the negative electrode terminals 11n (see FIG. 5) of the semiconductor modules 11. Further, the main N bus bar 30n is connected to the input N bus bar 5n at the main N bus bar connection section 31n. The entire main N bus bar 30n is not molded by the capacitor mold resin 46.

As shown in FIG. 1, the main P bus bar 30p is connected to the positive electrode terminal 11p (see FIG. 5) of each of the semiconductor modules 10, and is also connected to the input P bus bar 5p at the main P bus bar connection section 31p of the main P bus bar 30p. The main N bus bar 30n and the main P bus bar connection section 31p of the main P bus bar 30p are arranged outside of the capacitor mold resin 46.

As shown in FIG. 1, the positive electrode bus bar 45p is connected to a positive electrode terminal 44p of the smoothing capacitor 44. The positive electrode bus bar 45p has a positive electrode bus bar connection section 46p. The positive electrode bus bar connection section 46p and the main P bus bar connection section 31p are connected to the input N bus bar 5n.

The negative electrode bus bar 45n is connected to a negative electrode terminal 44n of the smoothing capacitor 44. The negative electrode bus bar 45n has a negative electrode bus bar connection section 46n. The negative electrode bus bar connection section 46n and the main N bus bar connection section 31n are connected to the input N bus bar 5n.

As shown in FIG. 1, the third storage section 8c accommodates the control board 20. The drive circuit drives each of the semiconductor modules 10. The drive circuit is arranged on the control board 20. The control circuit P connection section 53p, the control circuit N connection section 53n, the control circuit connection section 72 and a plurality of the control terminals 13 are connected to the control board 20.

The control circuit P connection section 53p, the control circuit N connection section 53n and the control circuit connection section 72 are projected to the inside of the third storage section 8c through the first through hole 82d. The control terminals 13 are projected to the inside of the third storage section 8c through the second through hole 82e.

Figure 2:
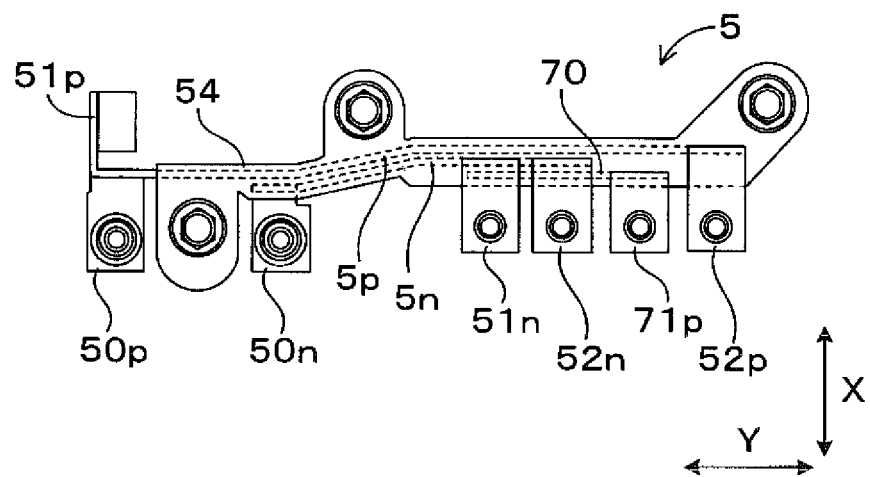
FIG. 2 is a top view showing an input bus bar module in the electric power conversion device according to the exemplary embodiment shown in FIG. 1.

FIG. 2 is a top view showing the input bus bar module 5 in the electric power conversion device 1 according to the exemplary embodiment shown in FIG. 1.

As shown in FIG. 1 and FIG. 2, the input P bus bar 5p, the input N bus bar 5n and the detection bus bar 70 are molded by input bus bar mold resin 54. That is, the input P bus bar 5p, the input N bus bar 5n and the detection bus bar 70 which are molded together form the input bus bar module 5. FIG. 1 shows a schematic structure of the input bus bar module 5 in which the first N connection section 51n, the second N connection section 52n, the first P connection section 71p and the second P connection section 52p are aligned in the direction Z. However, in an actual structure of the input bus bar module 5, the first N connection section 51n, the second N connection section 52n, the first P connection section 71p and the second P connection section 52p are arranged in the direction Y, as shown in FIG. 2.

As shown in FIG. 2, the first N connection section 51n, the second N connection section 52n, the first P connection section 71p, the second P connection section 52p, the input N connection section 50n, and the reactor connection section 51p are exposed from the input bus bar module 5. In the structure of the electric power conversion device 1 according to the exemplary embodiment, the first N connection section 51n and the second N connection section 52n are arranged adjacent to each other and the first P connection section 71p and the second N connection section 52n are arranged adjacent to each other. Further, the first N connection section 51n, the second N connection section 52n, the first P connection section 71p and the second P connection section 52p are arranged in order along the direction Y.

As shown in FIG. 2, the first N connection section 51n, the second N connection section 52n, the first P connection section 71p and the second P connection section 52p form a belt-like shape. Similar to this, as shown in FIG. 3, the capacitor N connection section 43n, the main N bus bar connection section 31n, the main P bus bar connection section 31p, the capacitor P connection section 43p, the positive electrode bus bar connection section 46p and the negative electrode bus bar connection section 46n form a belt-like shape.

The first N connection section 51n is tightly fastened to the capacitor N connection section 43n by a bolt (not shown). Similarly, the second P connection section 52p is tightly fastened to the capacitor P connection section 43p by a bolt (not shown).

On the other hand, the main N bus bar connection section 31n and the negative electrode bus bar connection section 46n are arranged in order, and tightly fastened to the second N connection section 52n together by a bolt (not shown).

Similarly, the main P bus bar connection section 31p and the positive electrode bus bar connection section 46p are arranged in order and tightly fastened to the first P connection section 71p together by a bolt (not shown).

As shown in FIG. 2 and FIG. 3, each of the first N connection section 51n, the second N connection section 52n, the first P connection section 71p and the second P connection section 52p extends in the direction X. These sections 51n, 52n, 71p and 52p are arranged in the direction Y which is perpendicular to the direction X.

Figure 4:
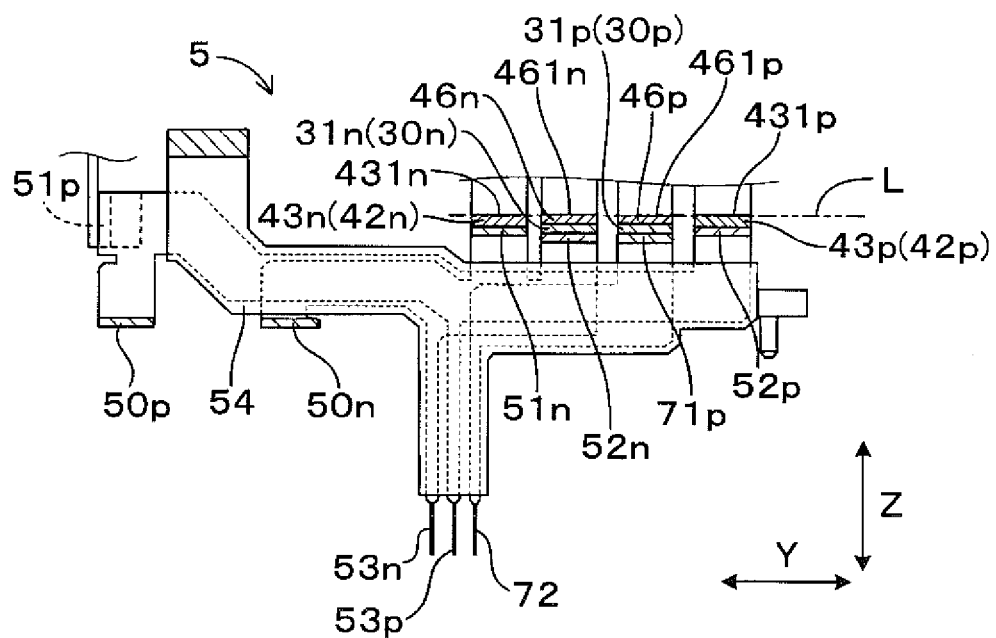
FIG. 4 is a view showing a cross section of the input bus bar module along the line IV-IV shown in FIG. 3.

FIG. 4 is a view showing a cross section of the input bus bar module 5 along the line IV-IV shown in FIG. 3. As shown in FIG. 4, the electric power conversion device according to the exemplary embodiment has the following improved structure in a cross section which is perpendicular to the extending direction (i.e. the direction X) and parallel to the arrangement direction (i.e. the direction Y).

The first N connection section 51n is connected to the capacitor N bus bar 42n at a capacitor N connection section 43n, and a surface 431n of the capacitor N connection section 43n is arranged at an opposite side of the first N connection section 51n.

Similarly, a negative electrode bus bar connection section 46n, the main N bus bar 30n and the second N connection section 52n are connected at a main N bus bar connection section 31n. A surface 461n of the negative electrode bus bar connection section 46n is arranged at an opposite side of the second N connection section 52n.

Further, the first P connection section 71p, the main P bus bar 30p and the positive electrode bus bar 45p are connected at the main P bus bar connection section 31p. A surface 461p of the positive electrode bus bar connection section 46p is arranged at an opposite side of the first P connection section 71p.

Still further, the second P connection section 52p is connected to the capacitor P bus bar 42p at a capacitor P connection section 43p. A surface 431p of the capacitor P connection section 43p is arranged opposite to the second P connection section 52p.

That is, as shown in FIG. 4, each of the surface 431n of the capacitor N connection section 43n, the surface 461n of the negative electrode bus bar connection section 46n, the surface 461p of the positive electrode bus bar connection section 46p, and the surface 431p of the capacitor P connection section 43p is arranged on a virtual straight line L designated by a long dashed double short dashed line.

As previously described in detail and shown in FIG. 1 to FIG. 5, the electric power conversion device 1 according to the exemplary embodiment is equivalent to, i.e. forms the circuit shown in FIG. 6. FIG. 6 schematically shows the input bus bar module 5, the capacitor module 40, the main P bus bar 30p and the main N bus bar 30n.

A description will now be given of the effects and behavior of the electric power conversion device 1 according to the exemplary embodiment in detail.

The electric power conversion device 1 according to the exemplary embodiment has the improved structure in which the main N bus bar 30n is connected to the input N bus bar 5n, not through the capacitor N bus bar 42n molded in the capacitor mold resin 46. That is, the main N bus bar 30n is not molded in the capacitor mold resin 46. This improved structure makes it possible to prevent the DC current from flowing in the capacitor module 40. As a result, the structure prevents propagation of heat energy generated by the DC power toward the filter capacitor 41 as the first capacitor and the smoothing capacitor 44 as the second capacitor molded in the capacitor mold resin 46 in the capacitor module 40. This improved structure makes it possible to prevent a temperature of the capacitors such as the filter capacitor 41 and the smoothing capacitor 44 in the capacitor module 40 from increasing. As a result, it possible for this structure to prevent the filter capacitor 41 and the smoothing capacitor 44 from being damaged, and provide the electric power conversion device 1 according to the exemplary embodiment with high reliability.

Further, the electric power conversion device 1 according to the exemplary embodiment has the improved structure in which the first N connection section 51n and the second N connection section 52n are arranged adjacent to each other. Each of the first N connection section 51n and the second N connection section 52n is formed in the input N bus bar 5n and has the same voltage potential. Accordingly, it is not necessary to use and arrange any insulation between them, and possible to form the first N connection section 51n and the second N connection section 52n with a small gap. This structure makes it possible to miniaturize the entire size of the electric power conversion device 1 as compared with a conventional structure in which the first N connection section 51n is electrically separated from the second N connection section 52n by a connection member. In the structure of the electric power conversion device 1 according to the exemplary embodiment, the first N connection section 51n and the second N connection section 52n are formed and arranged separately to each other. However, the concept of the present invention is not limited by this structure. It is also acceptable to assemble the first N connection is section 51n and the second N connection section 52n together.

Still further, the electric power conversion device 1 according to the exemplary embodiment has the improved structure in which the detection bus bar 70 having the first P connection section 71p, which is connected to the main P bus bar 30p, is connected to the main P bus bar 30p, and the first P connection section 71p and the second N connection section 52n are arranged adjacent to each other This structure makes it possible to reduce the inductance generated between the first P connection section 71p and the second N connection section 52n. This structure can reduce generation of noise.

Still further, in the structure of the electric power conversion device 1 according to the exemplary embodiment, the input P bus bar 5p, the input N bus bar 5n and the detection bus bar 70 are molded by the input bus bar mold resin 54 and form the input bus bar module 5. This structure makes it possible to handle the single assembly molded by the input bus bar mold resin 54, and improves working efficiency during the production of the electric power conversion device 1.

Further, the electric power conversion device 1 according to the exemplary embodiment has the smoothing capacitor 44 as the second capacitor, the positive electrode bus bar 45p and the negative electrode bus bar 45n. The positive electrode bus bar 45p is connected to the smoothing capacitor 44 and the first P connection section 71p. The negative electrode bus bar 45n is connected to the smoothing capacitor 44 and the second N connection section 52n.

Still further, each of the first N connection section 51n, the second N connection section 52n, the first P connection section 71p and the second P connection section 52p extends along the same direction X, which is perpendicular to the direction Y along which these sections 51n, 52n, 71p and 52p are arranged.

As shown in FIG. 4 and as previously described, in a cross section which is perpendicular to the extending direction (in the first direction X) and parallel to the arrangement direction (in the second direction Y), each of the surface 431n of the capacitor N connection section 43n, the surface 461n of the negative electrode bus bar connection section 46n, the surface 461p of the positive electrode bus bar connection section 46p, and the surface 431p of the capacitor P connection section 43p is arranged on the virtual straight line L designated by a long dashed double short dashed line.

The improved structure previously described makes it possible to improve the working efficiency when each bus bar is connected to each of the first N connection section 51n, the second N connection section 52n, the first P connection section 71p and the second P connection section 52p in a manufacturing process.

The electric power conversion device 1 according to the exemplary embodiment has the filter capacitor 41 as the first capacitor and the smoothing capacitor 44 as the second capacitor. However the concept of the present invention is not limited by this structure. For example, it is acceptable to use a smoothing capacitor as the first capacitor only, without using the second capacitor. In this modified structure, the negative electrode bus bar connection section 46n of the negative electrode bus bar 45n connected to this smoothing capacitor as the first capacitor is connected to the first N connection section 51n, and the positive electrode bus bar connection section 46p of the positive electrode bus bar 45p connected to this smoothing capacitor as the first capacitor is connected to the second P connection section 52p. This structure does not require, i.e. have the reactor connection section 51p and the detection bus bar 70.

In this modified structure, the main N bus bar 30n is connected to the input N bus bar 5n, not through the negative electrode bus bar 45n molded by the capacitor mold resin 46. Further, because the main N bus bar 30n is not molded by the capacitor mold resin 46, the modified structure can have the same effects and behavior of the structure of the electric power conversion device 1 according to the exemplary embodiment previously described.

Furthermore, in the structure of the electric power conversion device 1 according to the exemplary embodiment, the detection bus bar 70 is molded by the input bus bar mold resin 54. However the concept of the present invention is not limited by this structure. For example, it is acceptable to use the detection bus bar 70 which is not molded by the input bus bar mold resin 54.

As previously described in detail, the electric power conversion device 1 according to the exemplary embodiment and the modification thereof can suppress a temperature of each of the capacitors from increasing. This makes it possible to provide the electric power conversion device 1 with high reliability.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An electric power conversion device comprising:
   one or more semiconductor modules, each comprising built-in semiconductor elements, a positive electrode terminal, a negative electrode terminal and a control terminal;
   a control circuit board connected to the control terminal of the semiconductor module, and capable of driving the built-in semiconductor elements;
   a main P bus bar connected to the positive electrode terminal of the semiconductor module, through which direct current power is supplied;
   a main N bus bar connected to the negative electrode terminal of the semiconductor module, through which the direct current power is supplied;
   a capacitor module comprising a first capacitor, a capacitor P bus bar and a capacitor N bus bar, the first capacitor, the capacitor P bus bar and the capacitor N bus bar being molded by capacitor mold resin, the capacitor P bus bar being connected to a positive electrode terminal of the first capacitor, and the capacitor N bus bar being connected to a negative electrode terminal of the first capacitor;
   an input P bus bar connected to a positive electrode terminal of a direct current power source; and
   an input N bus bar connected to a negative electrode terminal of the direct current power source, the input N bus bar comprising a first N connection section and a second N connection section, the first N connection section being connected to the capacitor N bus bar, and the second N connection section being connected to the main N bus bar, and the main N bus bar being arranged outside of the capacitor mold resin with which the first capacitor, the capacitor P bus bar and the capacitor N bus bar are molded.

2. The electric power conversion device according to claim 1, wherein the first N connection section and the second N connection section are arranged adjacent to each other.

3. The electric power conversion device according to claim 1, further comprising a detection bus bar connected to the main P bus bar and the control board,
   wherein the detection bus bar comprising a first P connection section connected to the main P bus bar, and the first P connection section and the second N connection section are arranged adjacent to each other.

4. The electric power conversion device according to claim 2, further comprising a detection bus bar connected to the main P bus bar and the control board,
   wherein the detection bus bar comprising a first P connection section connected to the main P bus bar, and the first P connection section and the second N connection section are arranged adjacent to each other.

5. The electric power conversion device according to claim 3, wherein the input P bus bar, the input N bus bar and the detection bus bar are molded by input bus bar mold resin and form an input bus bar module.

6. The electric power conversion device according to claim 4, wherein the input P bus bar, the input N bus bar and the detection bus bar are molded by input bus bar mold resin and form an input bus bar module.

7. The electric power conversion device according to claim 5, further comprising:

a second capacitor;

a positive electrode bus bar connected to the second capacitor and the first P connection section; and a negative electrode bus bar connected to the second capacitor and the second N connection section, wherein the first N connection section, the second N connection section, the first P connection section and the second P connection section, each extends in a first direction and arranged in a second direction which is perpendicular to the first direction, and the first N connection section is connected to the capacitor N bus bar at a capacitor N connection section, and a surface of the capacitor N connection section is arranged at an opposite side of the first N connection section, a negative electrode bus bar connection section, the main N bus bar and the second N connection section are connected at a main N bus bar connection section, and a surface of the negative electrode bus bar connection section is arranged at an opposite side of the second N connection section, the first P connection section, the main P bus bar and the positive electrode bus bar are connected at a main P bus bar connection section, and a surface of the positive electrode bus bar connection section is arranged at an opposite side of the first P connection section, the second P connection section is connected to the capacitor P bus bar at a capacitor P connection section, and a surface of the capacitor P connection section is arranged opposite to the second P connection section, wherein each of the surface of the capacitor N connection section, the surface of the negative electrode bus bar connection section, the surface of the positive electrode bus bar connection section, and the surface of the capacitor P connection section is arranged on a virtual straight line in a cross section which is perpendicular to the first direction and parallel to the second direction.

8. The electric power conversion device according to claim 6, further comprising:

a second capacitor;

a positive electrode bus bar connected to the second capacitor and the first P connection section; and a negative electrode bus bar connected to the second capacitor and the second N connection section, wherein the first N connection section, the second N connection section, the first P connection section and the second P connection section, each extends in a first direction and arranged in a second direction which is perpendicular to the first direction, and the first N connection section is connected to the capacitor N bus bar at a capacitor N connection section, and a surface of the capacitor N connection section is arranged at an opposite side of the first N connection section, a negative electrode bus bar connection section, the main N bus bar and the second N connection section are connected at a main N bus bar connection section, and a surface of the negative electrode bus bar connection section is arranged at an opposite side of the second N connection section, the first P connection section, the main P bus bar and the positive electrode bus bar are connected at a main P bus bar connection section, and a surface of the positive electrode bus bar connection section is arranged at an opposite side of the first P connection section, the second P connection section is connected to the capacitor P bus bar at a capacitor P connection section, and a surface of the capacitor P connection section is arranged opposite to the second P connection section, wherein each of the surface of the capacitor N connection section, the surface of the negative electrode bus bar connection section, the surface of the positive electrode bus bar connection section, and the surface of the capacitor P connection section is arranged on a virtual straight line in a cross section which is perpendicular to the first direction and parallel to the second direction.

* * * * *